No. 834,888. PATENTED NOV. 6, 1906.
J. T. CALVERT.
HONEY KNIFE.
APPLICATION FILED MAR. 2, 1906.
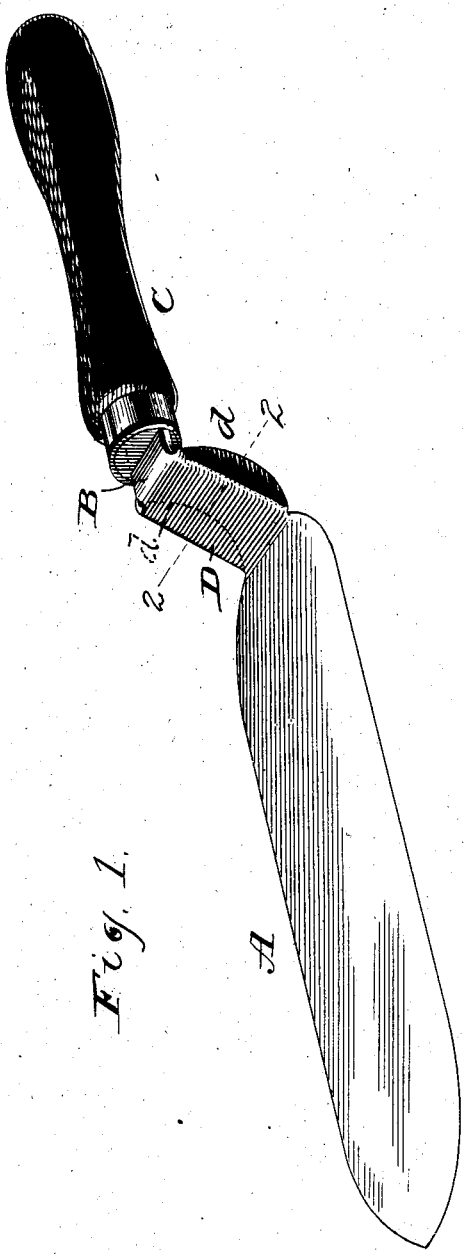
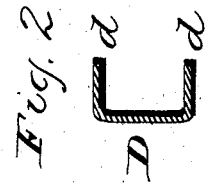
WITNESSES
J. L. Lawlor.
H. B. Prindle
INVENTOR
John T. Calvert,
by Prindle and Williamson
Attorneys,

UNITED STATES PATENT OFFICE.

JOHN T. CALVERT, OF MEDINA, OHIO, ASSIGNOR TO THE A. I. ROOT COMPANY, OF MEDINA, OHIO.

HONEY-KNIFE.

No. 834,888.     Specification of Letters Patent.     Patented Nov. 6, 1906.

Application filed March 2, 1906. Serial No. 303,807.

*To all whom it may concern:*

Be it known that I, JOHN T. CALVERT, of Medina, in the county of Medina, and in the State of Ohio, have invented a certain new and useful Improvement in Honey-Knives; and I do hereby declare that the following is a full, clear, and exact description thereof, reference being had to the accompanying drawings, in which—

Figure 1 is a perspective view of a honey-knife embodying my invention, and Fig. 2 a cross-section on the line 2 2 of Fig. 1.

The object of my invention is to improve the construction of knives for removing the caps from honeycombs, whereby the shanks of such knives may be stiffened and the knife more conveniently and comfortably gripped, and to such end my invention consists in the knife constructed substantially as hereinafter specified and claimed.

Honey-knives as ordinarily made comprise a blade A, a tang B for the application of a handle C, and a shank D, connecting the blade and tang and extending crosswise of the length of the blade and tang, so that the blade is offset from the handle, the blade, tang, and shank being of one piece, made by suitably bending a piece of sheet-steel. The blade must not be too thick, and with steel of the desired gage for the blade the shank when given the form as heretofore is lacking in stiffness or rigidity. I impart stiffness or rigidity to the shank by providing on each edge thereof a rearwardly-turned flange or rib $d$, that extends at a right angle or substantially a right angle to the shank, and said flanges not only stiffen the shank, but they present extended smooth surfaces for the thumb and forefinger of the hand of the user of the knife to grip against, so that the knife can be held and manipulated to better advantage and with much greater comfort than is the case with the knife as heretofore made.

It is to be understood, of course, that I do not limit the scope of my invention to the precise form of the flange or rib shown, nor to the particular design of blade, as there may be variations in details such as these which will involve no departure from the scope of my invention.

Having thus described my invention, what I claim is—

1. A tool, comprising in an integral piece, a blade, tang, and shank connecting the blade and tang, the shank being provided with a stiffening rib or ribs that extends at or substantially at a right angle to the shank, and the shank extending in a direction crosswise of the length of the tang and blade.

2. A tool, comprising in an integral piece, a blade, tang, and shank connecting the blade and tang, the tang being provided on each edge with a rearwardly-extending rib or flange, having an extended gripping-surface, and extending in a direction crosswise of the length of the tang and blade.

In testimony that I claim the foregoing I have hereunto set my hand.

JOHN T. CALVERT.

Witnesses:
   E. R. ROOT,
   FRANK SPELLMAN.